United States Patent
Birru

(10) Patent No.: US 8,973,303 B2
(45) Date of Patent: Mar. 10, 2015

(54) AMBIENT LIGHT CONTROL

(75) Inventor: Dagnachew Birru, Yorktown Heights, NY (US)

(73) Assignee: Koninklijkle Philips N.V., Eindhoven (NL)

( * ) Notice: Subject to any disclaimer, the term of this patent is extended or adjusted under 35 U.S.C. 154(b) by 0 days.

(21) Appl. No.: 13/976,602

(22) PCT Filed: Jan. 2, 2012

(86) PCT No.: PCT/IB2012/050004
§ 371 (c)(1),
(2), (4) Date: Jun. 27, 2013

(87) PCT Pub. No.: WO2012/093342
PCT Pub. Date: Jul. 12, 2012

(65) Prior Publication Data
US 2013/0276371 A1    Oct. 24, 2013

Related U.S. Application Data

(60) Provisional application No. 61/430,324, filed on Jan. 6, 2011.

(51) Int. Cl.
*E05F 15/20* (2006.01)
*E06B 9/24* (2006.01)
*H05B 37/02* (2006.01)

(52) U.S. Cl.
CPC . *E05F 15/20* (2013.01); *E06B 9/24* (2013.01); *H05B 37/0218* (2013.01); *Y02B 80/50* (2013.01); *Y02B 20/42* (2013.01)
USPC .............................. 49/31; 318/445

(58) Field of Classification Search
CPC ............... E06B 2009/6818; E06B 2009/6827; Y02B 80/50; Y02B 20/46; Y02B 20/44; Y02B 20/42

USPC ............... 49/29, 30, 31; 160/5; 318/445, 466, 318/468, 480; 700/275–278
See application file for complete search history.

(56) References Cited

U.S. PATENT DOCUMENTS 4,538,218 A * 8/1985 Watson ................... 362/295
5,134,347 A * 7/1992 Koleda ..................... 318/16
(Continued)

FOREIGN PATENT DOCUMENTS

GB    2462753 A    2/2010
JP    8106984 A    4/1996

OTHER PUBLICATIONS

Jong-Jin et al; "A Conceptual Framework for Dynamic Control of Daylighting and Electric Lighting Systems", IEEE 1993, pp. 2358-2364.

*Primary Examiner* — Katherine Mitchell
*Assistant Examiner* — Justin Rephann
(74) *Attorney, Agent, or Firm* — Meenakshy Chakravorty

(57) ABSTRACT

The invention relates to a control device (10) for use in an ambient light control system (20) for controlling ambient light entering a space (1) through an opening (2). An ambient light prediction unit (11) provides ambient light prediction values, which are predictions of an ambient light property at the opening (2). An ambient light adjusting unit (12) provides, at different ambient light adjusting time points, an ambient light adjusting signal depending on the ambient light prediction values for an upcoming ambient light prediction time period. The ambient light adjusting signal is adapted for use by an ambient light modifying element (22) for modifying the entering of ambient light into the space (1) through the opening (2). By taking the predicted ambient light conditions at the opening (2) into account, necessary adjustments can be made at temporally spaced ambient light adjusting time points, resulting in fewer disturbances of the users.

15 Claims, 2 Drawing Sheets

(56) References Cited

U.S. PATENT DOCUMENTS

| | | | |
|---|---|---|---|
| 5,237,169 A * | 8/1993 | Grehant | 250/214 AL |
| 5,598,000 A * | 1/1997 | Popat | 250/206 |
| 5,663,621 A * | 9/1997 | Popat | 318/480 |
| 5,675,487 A | 10/1997 | Patterson et al. | |
| 5,701,058 A * | 12/1997 | Roth | 315/158 |
| 6,084,231 A * | 7/2000 | Popat | 250/214 AL |
| 6,181,089 B1 * | 1/2001 | Kovach et al. | 318/16 |
| 6,259,218 B1 * | 7/2001 | Kovach et al. | 318/16 |
| 6,781,335 B2 * | 8/2004 | Osinga et al. | 318/445 |
| 6,812,662 B1 * | 11/2004 | Walker | 318/280 |
| 7,085,627 B2 * | 8/2006 | Bamberger et al. | 700/277 |
| 7,588,067 B2 * | 9/2009 | Veskovic | 160/5 |
| 7,977,904 B2 * | 7/2011 | Berman et al. | 318/480 |
| 8,102,586 B2 * | 1/2012 | Albahri | 359/265 |
| 8,125,172 B2 * | 2/2012 | Berman et al. | 318/480 |
| 8,228,184 B2 * | 7/2012 | Blakeley et al. | 340/539.1 |
| 8,248,014 B2 * | 8/2012 | Berman et al. | 318/466 |
| 8,288,981 B2 * | 10/2012 | Zaharchuk et al. | 318/468 |
| 8,417,388 B2 * | 4/2013 | Altonen et al. | 700/278 |
| 8,432,117 B2 * | 4/2013 | Berman et al. | 318/445 |
| 8,451,116 B2 * | 5/2013 | Steiner et al. | 340/545.3 |
| 8,508,169 B2 * | 8/2013 | Zaharchuk et al. | 318/468 |
| 8,525,462 B2 * | 9/2013 | Berman et al. | 318/480 |
| 8,587,242 B2 * | 11/2013 | Berman et al. | 318/466 |
| 8,639,387 B2 * | 1/2014 | Byberg et al. | 700/278 |
| 8,723,466 B2 * | 5/2014 | Chambers et al. | 318/445 |
| 8,723,467 B2 * | 5/2014 | Berman et al. | 318/466 |
| 2005/0001574 A1 * | 1/2005 | Bejean | 318/468 |
| 2005/0110416 A1 * | 5/2005 | Veskovic | 315/149 |
| 2006/0207730 A1 * | 9/2006 | Berman et al. | 160/310 |
| 2007/0189000 A1 * | 8/2007 | Papamichael et al. | 362/1 |
| 2009/0149973 A1 * | 6/2009 | Keller et al. | 700/90 |
| 2009/0254222 A1 * | 10/2009 | Berman et al. | 700/275 |
| 2010/0071856 A1 * | 3/2010 | Zaharchuk et al. | 160/5 |
| 2010/0157427 A1 * | 6/2010 | Berman et al. | 359/597 |
| 2010/0164398 A1 * | 7/2010 | Verburgh | 315/292 |
| 2010/0332034 A1 * | 12/2010 | Bergeson et al. | 700/275 |
| 2011/0209408 A1 * | 9/2011 | Scharf et al. | 49/31 |
| 2011/0213500 A1 * | 9/2011 | Scharf et al. | 700/276 |
| 2011/0240232 A1 * | 10/2011 | Kluck | 160/5 |
| 2012/0150485 A1 * | 6/2012 | Wang | 702/150 |
| 2012/0261079 A1 * | 10/2012 | Chambers et al. | 160/6 |
| 2012/0320560 A1 * | 12/2012 | Van Der Poel et al. | 362/1 |
| 2013/0063065 A1 * | 3/2013 | Berman et al. | 318/480 |
| 2013/0226351 A1 * | 8/2013 | Altonen et al. | 700/275 |
| 2013/0306246 A1 * | 11/2013 | Zaharchuk et al. | 160/5 |

\* cited by examiner

AMBIENT LIGHT CONTROL

FIELD OF THE INVENTION

The invention relates to a control device for use in an ambient light control system for controlling ambient light entering a space through an opening. The invention further relates to a corresponding ambient light control system, to a control method for use in an ambient light control method for controlling ambient light entering a space through an opening was well as to a corresponding ambient light control method.

BACKGROUND OF THE INVENTION

U.S. Pat. No. 5,675,487 A discloses a system for controlling solar radiation through a window. The control system comprises fenestration blinds that are disposed at the window and that are adjustable in angle to control solar radiation entering the window. First and second photovoltaic sensors are disposed proximate respective exterior and interior sides of the fenestration blinds for providing a signal representative of the incident solar radiation at the respective exterior and interior sides. An electrical motor is disposed proximate the window and is operably connected to the fenestration blinds in a manner to control the angle thereof. A microprocessor control device is provided for providing control signals to the motor to adjust the angle of the fenestration blinds. In one mode of operation, the microprocessor compares the ratio of the signals representative of solar radiation incident at the exterior and interior sides in response to adjustment of the angle and a preset ratio stored in the microprocessor representative of minimum direct light and maximum indirect light entering the window and continues to provide control signals to the motor to adjust the angle until the ratio of the signals approximates a preset ratio. The control system has the disadvantage that the continuous adjustments of the fenestration blinds may disturb the users and may therefore not be appreciated by them.

SUMMARY OF THE INVENTION

It is an object of the present invention to provide a control device for use in an ambient light control system for controlling ambient light entering a space through an opening, which causes fewer disturbances of the users. It is a further object of the present invention to provide a corresponding ambient light control system, a control method for use in an ambient light control method for controlling ambient light entering a space through an opening as well as a corresponding ambient light control method.

In a first aspect of the present invention a control device for use in an ambient light control system for controlling ambient light entering a space through an opening is presented, the control device comprising:
   an ambient light prediction unit for providing ambient light prediction values, wherein an ambient light prediction value is a prediction of an ambient light property at the opening,
   an ambient light adjusting unit for providing, at different ambient light adjusting time points, an ambient light adjusting signal depending on the ambient light prediction values for an upcoming ambient light prediction time period, wherein the ambient light adjusting signal is adapted for use by an ambient light modifying element for modifying the entering of ambient light into the space through the opening.

The invention is based on the idea that by providing ambient light prediction values, which are predictions of the ambient light property at the opening, it is possible to forecast or predict the ambient light property at the opening for an upcoming ambient light prediction time period, i.e., it is possible to make a prediction about how the ambient light property is going to be at the opening during, for example, the next hour or so. By making the provision of the ambient light adjusting signal dependent on such "long term" predictions—rather than on the momentary ambient light conditions at the opening—it is possible to take the predicted ambient light conditions into account and to make adjustment decisions that can be expected to be appropriate for the duration of the upcoming ambient light prediction time period. It is therefore not required to make continuous adjustments to the entering of ambient light into the space through the opening, but it is rather sufficient to make the necessary adjustments at different, i.e., temporally spaced, ambient light adjusting time points, resulting in fewer disturbances of the users.

Preferentially, the ambient light is daylight, but it could also be, for example, moonlight. The ambient light is not limited to comprise only direct light, for example, direct sun light, by can also comprise other light, such as reflected light or diffused light.

The space can be, for example, a room of a building, such as an office room of an office building, and the opening can be, for example, a window.

The ambient light prediction unit can provide the ambient light prediction values, for example, based on stored data representing actual measurements of the ambient light property at the opening over the year. Alternatively, the ambient light prediction values can be derived from a dedicated ambient light model. For example, if the ambient light is daylight, such a model may take into account information about the movement of the sun over the year, the relative orientation of the opening with respect to the sun, the shading properties of the surroundings, etc.

The different ambient light adjusting time points may have any suitable temporal spacing, e.g., a half hour, an hour, or even more. The actual choice of the temporal spacing is a trade-off between two different effects. On the one hand, using a shorter temporal spacing from one ambient light adjusting time point to the next may lead to more frequent adjustments to the entering of ambient light into the space through the opening, but the adjustment decisions may be more appropriate for the duration of the upcoming ambient light prediction time period. On the other hand, using a longer temporal spacing from one ambient light adjusting time point to the next may lead to fewer adjustments to the entering of ambient light into the space through the opening, but the adjustment decisions may be less appropriate for the duration of the upcoming ambient light prediction time period.

An ambient light modifying element may be an element that is adapted to make modifications to the entering of ambient light into the space through the opening by, for example, moving adjustable window treatments, such as motorized blinds, curtains, shades or the like, provided at the opening. For example, an ambient light modifying element may be an element that is adapted to reduce the amount of ambient light entering a room through a window by partly or fully lowering blinds provided at the window and for increasing the amount of ambient light entering the room by partly or fully retracting the blinds.

How the entering of ambient light into the space through the opening shall be modified is indicated to an ambient light modifying element by means of the ambient light adjusting signal provided by the ambient light adjusting unit. The ambient light adjusting signal can be adapted to have any suitable format that is used by a particular ambient light modifying element. Also, it is possible, that in order to indicate that no modification shall be made to the entering of ambient light into the space through the opening, no ambient light adjusting signal is provided by the ambient light adjusting unit at a given ambient light adjusting time point.

It is preferred that the ambient light property at the opening is the vertical illuminance of the ambient light at the opening.

The term "vertical illuminance", as used herein, is intended to denote the component of the illuminance of the ambient light that is perpendicular to a vertical surface. For example, if the opening is a vertical window, the vertical illuminance of the ambient light at the window corresponds to the density of luminous flux incident upon the window, as measured, for example, by an illuminance meter that is held flat against the window.

It is further preferred that the ambient light adjusting unit is adapted to provide the ambient light adjusting signal at several ambient light adjusting time points, wherein the ambient light adjusting signal at a current ambient light adjusting time point is provided depending on the ambient light prediction values for the upcoming ambient light prediction time period, wherein the upcoming ambient light prediction time period is the time period from the current ambient light adjusting time point until the next ambient light adjusting time point.

In other words, the upcoming ambient light prediction time period may be the time period between two successive ambient light adjusting time points. This is advantageous, because it allows to make the adjustment decision at a current ambient light adjusting time point dependent on just those ambient light conditions that are expected for the time period until the next ambient light adjusting time point.

It is preferred that the ambient light adjusting unit is adapted to provide the ambient light adjusting signal depending on a comparison of the ambient light prediction values for the upcoming ambient light prediction time period with at least one ambient light prediction threshold value.

Comparing the ambient light prediction values for the upcoming ambient light prediction time period with at least one ambient light prediction threshold value provides a simple way of classifying the ambient light conditions that are expected for the upcoming ambient light prediction time period into. An appropriate adjustment decision can then be made depending on this simple classification.

For example, in a preferred case, the ambient light adjusting unit provides the ambient light adjusting signal for use by an ambient light modifying element such that:

a) in case that the ambient light prediction values for the upcoming ambient light prediction time period are larger than a first ambient light prediction threshold value, the ambient light adjusting signal indicates to an ambient light modifying element that the amount of ambient light entering the space through the opening shall be reduced, for example, by fully lowering blinds provided at the opening, and that;

b) in case that the ambient light prediction values for the upcoming ambient light prediction time period are smaller than a second ambient light prediction threshold value, the ambient light adjusting signal indicates to an ambient light modifying element that the amount of ambient light entering the space through the opening shall be increased, for example, by fully retracting the blinds.

It is further preferred that the ambient light adjusting unit is adapted to provide the ambient light adjusting signal such that when the ambient light prediction values for the upcoming prediction time period are not all either larger than a first ambient light prediction threshold or smaller than a second ambient light prediction threshold, the second ambient light prediction threshold value being smaller than the first ambient light prediction threshold value, the ambient light adjusting signal indicates that no modification shall be made to the entering of ambient light into the space through the opening.

This further reduces the amount of adjustments that are made to the entering of ambient light into the space through the opening.

It is preferred that the control device further comprises a sensed ambient light receiving unit for receiving sensed ambient light values indicative of the ambient light property at the opening, wherein the ambient light prediction unit is adapted to provide the ambient light prediction values depending on the received sensed ambient light values for a past ambient light sensing time period.

By providing the ambient light prediction values depending on the received sensed ambient light values for a past ambient light sensing time period, it is possible to use the "history" of the sensed ambient light values to forecast or predict the ambient light property at the opening for the upcoming ambient light prediction time period. In other words, the ambient light prediction unit can "self learn" the predicted ambient light conditions from the ambient light conditions that have been sensed before. This has the advantage that no additional data, such as, for example, a dedicated ambient light model, is required by the ambient light prediction unit.

It is further preferred that the past ambient light sensing time period comprises one or more past days, wherein the ambient light prediction unit is adapted to provide the ambient light prediction value for a given time of day such that it is indicative of the probability that the ambient light property at the opening exceeds an ambient light property threshold value at the given time of day.

The probability may be determined, for example, by statistically modeling the temporal distribution of the ambient light property at the opening over the course of the day. The model parameters can be determined by the ambient light prediction unit from the received sensed ambient light values for the one or more past days. An advantage of such an approach is that by modeling the daily variation of the ambient light property at the opening by means of a suitable statistical distribution model, the influence of outliers in the received sensed ambient light values on the provision of the ambient light prediction values may be reduced. Good results may be obtained, for example, with a simple Gaussian distribution model.

It is preferred that the past ambient light sensing time period comprises one or more past days, wherein the ambient light prediction unit is adapted to provide the ambient light prediction value for a given time of day depending on the received sensed ambient light values for the given time of day at the one or more past days.

It can be expected that the ambient light property at the opening at a given time of day will only slowly change over the course of the days—ignoring instant changes of the ambient light conditions due to clouds, etc. Thus, it can be expected that the ambient light prediction value for a given time of day can quite well be predicted by taking into account the received sensed ambient light values for the given time of day at one or more past days.

How many past days are taken into account for the provision of the ambient light prediction values is a trade-off between two different effects. On the one hand, using fewer past days makes the prediction more sensitive to the regular seasonal changes of the ambient light property, but also more prone to contortions caused by instant changes of the ambient light conditions due to clouds, etc. On the other hand, using more past days makes the prediction less sensitive to the regular seasonal changes of the ambient light property, but also less prone to contortions caused by instant changes of the ambient light conditions due to clouds, etc. In general, it can be expected that due to the above described "self learning" ability of the ambient light prediction unit, the quality of the provided ambient light prediction values will improve—at least initially—as the received sensed ambient light values for an increasing number of past days become available.

It is further preferred that the ambient light prediction unit is adapted to provide the ambient light prediction value for the given time of day such that it is indicative of the maximum value of the ambient light property at the opening at the given time of day at the one or more past days.

If the ambient light prediction values for the upcoming ambient light prediction time interval are provided in this way, they are indicative of the highest values of the ambient light property at the opening that can reasonably be expected. If these ambient light prediction values are then used for making an adjustment decision, it may more easily be ensured that the amount of ambient light entering the space through the opening is reduced so as to not disturb the user.

It is preferred that the ambient light adjusting unit is adapted to provide the ambient light adjusting signal such that it indicates that the amount of ambient light entering the space through the opening shall be reduced, if a currently received sensed ambient light value exceeds a sensed ambient light threshold value.

This makes it possible for the ambient light adjusting unit to also react directly on the current ambient light conditions at the opening. In particular, it allows the ambient light adjusting unit to make the adjustment decision that the amount of ambient light entering the space through the opening shall be reduced, if the currently received sensed ambient light value indicates that the current ambient light property at the opening is so "high" that it exceeds the sensed ambient light threshold value. Preferably, this adjustment decision can be made at any time between two successive ambient light adjusting time points.

It is further preferred that the control device comprises a predicted weather data receiving unit for receiving predicted weather data, wherein the ambient light adjusting unit 12 is adapted to provide the ambient light adjusting signal depending on the received predicted weather data.

This allows the ambient light adjusting unit to take current weather predictions into account when providing the ambient light adjusting signal. Because such up-to-date weather predictions may be very reliable, they may provide a better basis for an adjustment decision than the ambient light prediction values provided by the ambient light prediction unit. For example, if the predicted weather is "heavy cloudy" for the next few hours, the ambient light adjusting unit may make the adjustment decision, based on this weather prediction, that the amount of light entering the space through the opening shall be increased, even though the decision may be different when based on the provided ambient light prediction values.

It is preferred that the control device comprises a sensed occupancy state receiving unit for receiving a sensed occupancy state indicative of the space being occupied, wherein the ambient light adjusting unit is adapted to provide the ambient light adjusting signal for modifying the entering of ambient light into the space through the opening when the received sensed occupancy state indicates that the space is not occupied.

By doing so, it may be possible to make necessary adjustments only at times when no user is present in the space, who could be disturbed by the adjustments.

In another aspect of the present invention a control method for use in an ambient light control method for controlling ambient light entering a space through an opening is presented, the control method comprising:
  providing ambient light prediction values, by an ambient light prediction unit, wherein an ambient light prediction value is a prediction of an ambient light property at the opening,
  providing, at different ambient light adjusting time points, an ambient light adjusting signal depending on the ambient light prediction values for an upcoming ambient light prediction time period, by an ambient light adjusting unit, wherein the ambient light adjusting signal is adapted for use by an ambient light modifying element for modifying the entering of ambient light into the space through the opening.

In another aspect of the present invention a computer program for use in an ambient light control system for controlling ambient light entering a space through an opening is presented, the computer program comprising program code means for causing a control device as defined in claim 1 to carry out the steps of the method as defined in claim 12, when the computer program is run on a computer controlling the control device.

In another aspect of the present invention an ambient light control system for controlling ambient light entering a space through an opening is presented, the ambient light control system comprising:
  a control device as defined in claim 1,
  an ambient light modifying element for modifying the entering of the ambient light into the space through the opening depending on the ambient light adjusting signal.

If the control device for use in an ambient light control system for controlling ambient light entering a space through an opening comprises a sensed ambient light receiving unit, the corresponding ambient light control system can contain a suitable ambient light sensing unit. Moreover, if the control device comprises a sensed occupancy state receiving unit, the corresponding ambient light system can contain a suitable occupancy state sensing unit.

In another aspect of the present invention, an ambient light control method for controlling ambient light entering a space through an opening is presented, the ambient light control method comprising:
  the steps of the control method as defined in claim 12,
  modifying the entering of the ambient light into the space through the opening depending on the ambient light adjusting signal, by an ambient light modifying element.

It shall be understood that the control device for use in an ambient light control system for controlling ambient light entering a space through an opening of claim 1, the corresponding control method of claim 12, the corresponding computer program of claim 13, the ambient light control system for controlling ambient light entering a space through an opening of claim 14 as well as the corresponding ambient light control method of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
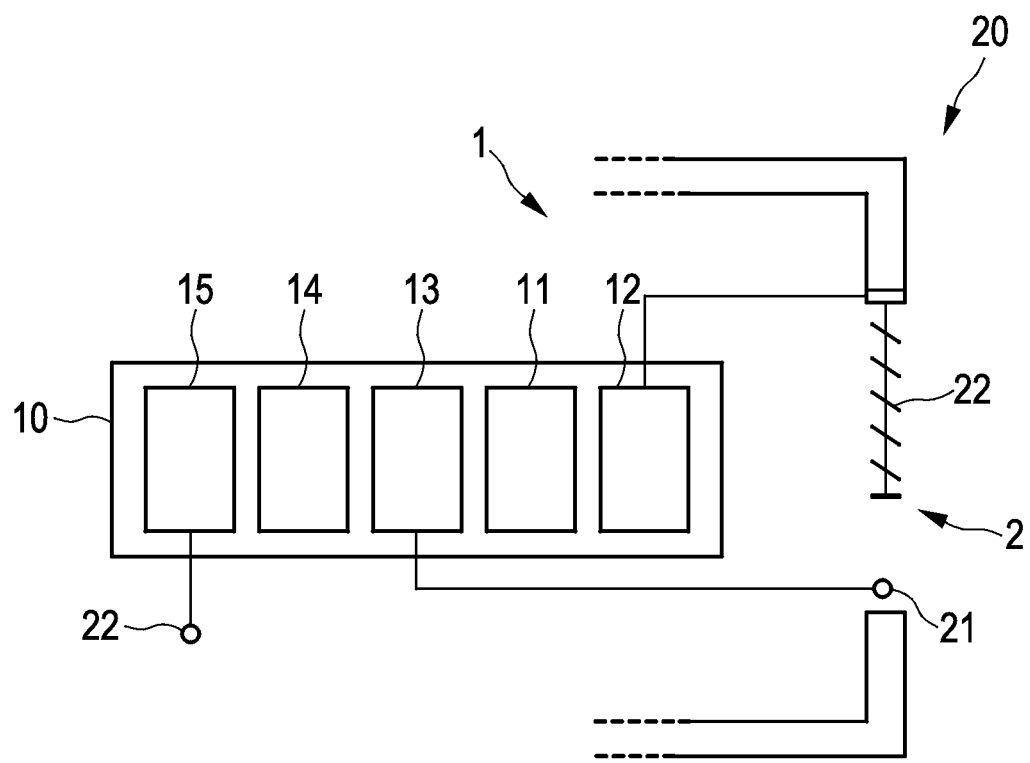
FIG. 1 shows schematically and exemplarily an embodiment of an ambient light control system for controlling ambient light entering a space through an opening.

FIG. 1 shows schematically and exemplarily an embodiment of an ambient light control system 20 for controlling ambient light entering a space 1 through an opening 2. The space 1, in this embodiment, is a room of a building and the opening 2 is a window. The ambient light that is controlled by the ambient light control system 20 is daylight, but, it could also be moonlight or the like.

The ambient light control system 20 comprises an ambient light sensing unit 21 for providing sensed ambient light values indicative of the ambient light property at the opening 2. The ambient light sensing unit 21 is arranged at or near the opening 2 and the ambient light property at the opening 2, which the sensed ambient light values are indicative of, is the vertical illuminance of the ambient light at the opening 2. The ambient light control system further comprises a control device 10 as well as an ambient light modifying element 22 for modifying the entering of ambient light into the space 1 through the opening 2.

The ambient light modifying element 22, in this embodiment, comprises adjustable window treatments, in this case, motorized blinds, provided at the opening 2. In other embodiments, the ambient light modifying element 22 could comprise other adjustable window treatments, such as curtains, shades or the like, provided at the opening 2.

The control device 10 comprises a sensed ambient light receiving unit 13 for receiving sensed ambient light values indicative of an ambient light property at the opening 2. The sensed ambient light receiving unit 13 receives the sensed ambient light values from the ambient light sensing unit 21. The connection between the ambient light sensing unit 21 and the sensed ambient light receiving unit 13 is a wireless connection. Alternatively, the connection can also be a wired connection. The ambient light sensing unit 21 may be battery powered or may be connected to a suitable power supply system.

The control device 10 further comprises an ambient light prediction unit 11 for providing ambient light prediction values, which are predictions of the ambient light property at the opening 2. In this embodiment, the ambient light prediction values are provided by the ambient light prediction unit 11 depending on received sensed ambient light values for a past ambient light sensing time period.

The past ambient light sensing time period, in this embodiment, comprises one or more past days, wherein the ambient light prediction unit 11 is adapted to provide the ambient light prediction value for a given time of day such that it is indicative of the probability that the ambient light property at the opening 2 exceeds an ambient light property threshold value at the given time of day. In more detail, in this embodiment, the ambient light prediction value for a given time of day is provided by the ambient light prediction unit 11 as the probability:

$$P(v>\beta,t),$$

where t is the given time of day, v is the ambient light property at the opening 2, and $\beta$ is the ambient light property threshold value. In this embodiment, where the ambient light property at the opening 2 is the vertical illuminance, the ambient light property threshold value is a vertical illuminance threshold value, for example, a value of 4000 Lux.

The probability $P(v>\beta,t)$ may be determined, for example, by statistically modeling the temporal distribution of the ambient light property at the opening 2 at a given time of day. In this embodiment, a Gaussian distribution model:

$$P(v, t) = \frac{1}{\sqrt{2\pi\sigma^2}} e^{-(v(t)-\mu)^2/(2\sigma^2)},$$

is used, wherein t is the given time of day, $\mu$ is the mean, i.e., the location of the peak, of the model at the given time of day t, and $\sigma^2$ is its variance, i.e., the measure of the width of the distribution, at the given time of day t. Moreover, v(t) is the ambient light property at the opening 2 at the given time of day t. The mean pi and the variance $\sigma^2$ reflect the statistics of the ambient light property at the opening 2 at the given time of day t over the one or more past days. They are determined by the ambient light prediction unit 11 from the received sensed ambient light values for the one or more past days.

Instead of using a statistical distribution model, as described above, the probability that the ambient light property at the opening 2 exceeds an ambient light property threshold value at the given time of day, $P(v>\beta,t)$ can also be approximated from the received sensed ambient light values for the given time of day at the one or more past days by simply counting on how may of the one or more past days of the past ambient light sensing time period the ambient light property at the opening 2 exceeded the ambient light property threshold value and by dividing this value by the number of the one or more past days, i.e., the probability $P(v>\beta,t)$ can be approximated by calculating:

$$P(v > \beta, t) = \frac{1}{N} \sum_{i=1}^{N} v_i(t) > \beta,$$

where t is the given time of day, $v_i(t)$ is the ambient light property at the opening 2 at the given time of day t at one of a number of N past days, and $\beta$ is the ambient light property threshold value.

In other embodiments, the past ambient light sensing period may also comprise one or more past days, but the ambient light prediction unit 11 may be adapted to provide the ambient light prediction value for a given time of day "directly", i.e., as a value of the ambient light property at the opening 2, depending on received sensed ambient light values for the given time of day at the one or more past days.

For example, in one embodiment, the ambient light prediction unit 11 may be adapted to provide the ambient light prediction value for a given time of day such that is indicative of the maximum value of the ambient light property at the opening 2 at the given time of day at the one or more past days.

In more detail, in this example, the ambient light prediction value for a given time of day is provided by the ambient light prediction unit 11 as:

$$v_{max}(t) = \max_{i=1...N} v_i(t),$$

where t is the given time of day and $v_i(t)$ is the ambient light property at the opening 2 at the given time of day t at one of a number of N past days.

The control device 10 further comprises an ambient light adjusting unit 12 for providing, at different ambient light adjusting time points, an ambient light adjusting signal depending on the ambient light prediction values for an upcoming ambient light prediction time period. In this embodiment, the upcoming ambient light adjusting time period is the time period from a current ambient light adjusting time point until the next ambient light adjusting time point. In other words, in this embodiment, the upcoming ambient light prediction time period is the time period between two successive ambient light adjusting time points.

The different ambient light adjusting time points may have any suitable temporal spacing, e.g., a half hour, an hour, or even more. In this embodiment, the spacing between the different ambient light adjusting time points is one hour.

The ambient light adjusting signal is adapted for use by the ambient light modifying element 22 for modifying the entering of ambient light into the space 1 through the opening 2. In this embodiment, the ambient light adjusting unit 12 provides the ambient light adjusting signal to the ambient light modifying element 22.

The ambient light adjusting unit 12, in this embodiment, is adapted to provide the ambient light adjusting signal depending on a comparison of the ambient light prediction values for the upcoming ambient light prediction time period with at least one ambient light prediction threshold value. In this embodiment, where the ambient light prediction value for a given time of day is provided by the ambient light prediction unit 11 as the probability $P(v>\beta,t)$, i.e., the probability that the ambient light property at the opening 2 exceeds an ambient light property threshold value at the given time of day, the ambient light adjusting signal may be provided by the ambient light adjusting unit 12 as follows:

a) The ambient light adjusting signal indicates to the ambient light modifying element 22 that the amount of ambient light entering the space 1 through the opening 2 shall be reduced, if:

$$P(v>\beta,t)>\delta_1 \text{ for } t_1 \leq t \leq t_2,$$

wherein $\delta_1$ is a first ambient light prediction threshold value, in this example, a probability value such as 20%, 50% or 80% probability, and $t_1$, $t_2$ define the upcoming ambient light prediction time period. In this case, the ambient light modifying element 22 may fully lower the blinds provided at the opening 2 in order to reduce the amount of ambient light entering the space 1 through the opening 2.

b) The ambient light adjusting signal indicates to the ambient light modifying element 22 that the amount of ambient light entering the space 1 through the opening 2 shall be increased, if:

$$P(v>\beta,t)<\delta_2 \text{ for } t_1 \leq t \leq t_2,$$

wherein $\delta_2$ is a second ambient light prediction threshold value, which is smaller than the first ambient light prediction threshold value $\delta_1$. In this case, the ambient light modifying element 22 may fully retract the blinds provided at the opening 2 in order to increase the amount of ambient light entering the space 1 through the opening 2.

c) The ambient light adjusting signal indicates to the ambient light modifying element 22 that no modifications shall be made to the entering of ambient light into the space 1 through the opening 2, if the ambient light prediction values for the upcoming prediction time period are not all either larger than the first ambient light prediction threshold value $\delta_1$ or smaller than the second ambient light prediction threshold value $\delta_2$.

In other words, the ambient light adjusting unit 12 checks, at a current ambient light adjustment time point, the predicted ambient light conditions. If the ambient light adjusting unit 12 determines that the ambient light property at the opening 2 is likely to be "high", i.e., larger than the first ambient light prediction threshold value $\delta_1$, for the upcoming ambient light prediction time period, it makes the adjustment decision that the amount of ambient light entering the space 1 through the opening 2 shall be reduced. On the other hand, if the ambient light adjusting unit 12 determines that the ambient light property at the opening 2 is likely to be "low", i.e., smaller than the second ambient light prediction threshold value $\delta_2$, for the upcoming ambient light prediction time period, it makes the adjustment decision that the amount of ambient light entering the space 1 through the opening 2 shall be increased. Finally, if the ambient light adjusting unit 12 determines that the ambient light property at the opening 2 is neither likely to be all "high" or all "low" for the upcoming ambient light prediction time period, it makes the adjustment decision that the amount of ambient light entering the space 1 through the opening 2 shall be maintained.

A corresponding comparison of the ambient light prediction values for the upcoming ambient light prediction time period with at least one ambient light prediction threshold value can also be made, when the ambient light prediction values are determined by one of the other methods described above.

In this embodiment, the ambient light adjusting unit 12 is adapted to provide the ambient light adjusting signal such that it indicates that the amount of ambient light entering the space through the opening shall be reduced, if a currently received sensed ambient light value exceeds a sensed ambient light threshold value. The ambient light adjusting can therewith also react directly on the current ambient light conditions at the opening 2. In particular, it can indicate to the ambient light modifying element 22, by means of the ambient light adjusting signal, that it shall reduce the amount of ambient light entering the space through the opening, when the current ambient light property at the opening is so "high" that it exceeds the sensed ambient light threshold value. Preferably, this adjustment decision can be made at any time between two successive ambient light adjusting time points.

The control device 10 further comprises a predicted weather data receiving unit 14 for receiving predicted weather data, wherein the ambient light adjusting unit 12 is adapted to provide the ambient light adjusting signal depending on the received predicted weather data. The ambient light adjusting unit can therewith take current weather predictions into account when making an adjustment decision.

In this embodiment, the control device 10 also comprises a sensed occupancy state receiving unit 15 for receiving a sensed occupancy state indicative of the space being occupied. The occupancy state, in this case, is sensed by an occupancy state sensing unit 22 that is comprised by the ambient light control system 20. The ambient light adjusting unit 11 is adapted to provide the ambient light adjusting signal for modifying the entering of ambient light into the space 1 through the opening 2 when the received sensed occupancy state indicates that the space 1 is not occupied. Necessary adjustments can therefore be made at times when no user, who could be disturbed by the adjustments, is present in the space 1.

Figure 2:
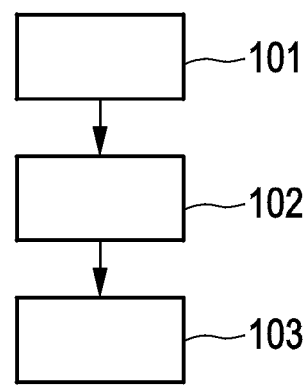
FIG. 2 shows exemplarily a flowchart illustrating an embodiment of an ambient light control method for controlling ambient light entering a space through an opening.

FIG. 2 shows exemplarily a flowchart illustrating an embodiment of an ambient light control method for controlling ambient light entering a space through an opening. In step 101, ambient light prediction values are provided by an ambient light prediction unit 11, wherein an ambient light prediction value is a prediction of an ambient light property at the opening 2. In step 102, an ambient light adjusting signal is provided, at different ambient light adjusting time points, depending on the ambient light prediction values for an upcoming ambient light prediction time period by an ambient light adjusting unit 12, wherein the ambient light adjusting signal is adapted for use by an ambient light modifying element 22 for modifying the entering of ambient light into the space 1 through the opening 2. In step 103, the entering of the ambient light into the space 1 through the opening 2 is modified depending on the ambient light adjusting signal by an ambient light modifying element 22.

While the invention has been illustrated and described in detail in the drawings and foregoing description, such illustration and description are to be considered illustrative or exemplary and not restrictive; the invention is not limited to the disclosed embodiments.

Although, in the above described embodiment of an ambient light control system 20 for controlling ambient light entering a space 1 through an opening 2, the control device 10 comprises a sensed ambient light receiving unit 13 and the ambient light control system 20 comprises an ambient light sensing unit 21. In other embodiments, these elements do not have to be present, for example, the ambient light prediction unit 11 of the control device 10 may be adapted to provide the ambient light prediction values based on a dedicated ambient light model, which may be stored in or otherwise provided to the ambient light prediction unit 11.

Also, it is not necessary in all embodiments of the ambient light control system 20 that the control device 10 comprises a sensed occupancy state receiving unit 15, and that the ambient light control system 20 comprises an occupancy state sensing unit 22. In this case, the ambient light adjusting unit 12 may make adjustment decisions without taking the occupancy state of the space 1 into account.

Moreover, it is also not required that the control device 10 comprises a predicted weather data receiving unit 14. In this case, the ambient light prediction unit 11 may provide the ambient light prediction values without taking the predicted current weather into account.

It is possible in the above described embodiment of an ambient light control system 20 for controlling ambient light entering a space 1 through an opening 2 that the ambient light prediction values are already determined in the ambient light sensing unit 21 and that these values are then provided to the control device 10, in particular, to the ambient light adjusting unit 12.

Preferentially, the control device 10 will allow the input of user preferences or requirements, which may be used in the control of ambient light entering the space 1 through the opening 2.

Moreover, if the control device 10 comprises a model about the movement of the sun over the year and the relative orientation of the opening 2 with respect to the sun position, the ambient light adjusting unit 12 may gradually adjust the entering of ambient light into the space 1 through the opening 2, for example, by indicating the ambient light modifying element 22, which, in this embodiment, comprises motorized blinds provided at the opening 2, to gradually move the blinds to match the modeled sun position.

The ambient light control system 20 may be integrated with an interior light control system that controls the interior lighting within the space depending on sensed interior light values. For example, such a system may sense the illuminance within the space and control an electrical light depending on the sensed illuminance.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a control device for use in an ambient light control system for controlling ambient light entering a space through an opening. An ambient light prediction unit provides ambient light prediction values, which are predictions of an ambient light property at the opening. An ambient light adjusting unit provides, at different ambient light adjusting time points, an ambient light adjusting signal depending on the ambient light prediction values for an upcoming ambient light prediction time period. The ambient light adjusting signal is adapted for use by an ambient light modifying element for modifying the entering of ambient light into the space through the opening. By taking the predicted ambient light conditions at the opening into account, necessary adjustments can be made at temporally spaced ambient light adjusting time points, resulting in fewer disturbances of the users.

The invention claimed is:

1. A control device for use in an ambient light control system for controlling ambient light entering a space through an opening, the control device comprising:

an ambient light prediction unit for providing ambient light prediction values, wherein an ambient light prediction value is a prediction of an ambient light property at the opening, and an ambient light adjusting unit for providing, at different ambient light adjusting time points, an ambient light adjusting signal depending on the ambient light prediction values for an upcoming ambient light prediction time period, wherein the ambient light adjusting unit is adapted to provide the ambient light adjusting signal at several ambient light adjusting time points, wherein the ambient light adjusting signal is adapted for use by an ambient light modifying element for modifying the entering of ambient light into the space through the opening wherein the ambient light adjusting signal at a first ambient light adjusting time point is provided depending on the ambient light prediction values for the upcoming ambient light prediction time period, wherein the upcoming ambient light prediction time period is the time period from the first ambient light adjusting time point until a second ambient light adjusting time point, wherein the first ambient light adjusting time point comprises a first ambient light prediction value, and wherein the first ambient light prediction value for the first ambient light adjusting time point comprises the following probability:

$$P(v>\beta,t)$$

where P is a probability that an ambient light property at the opening exceeds an ambient light property threshold value at a given time of day, t is the given time of day, v is the ambient light property at the opening, and β is the ambient light property threshold value.

2. The control device according to claim 1, wherein the ambient light property at the opening is a vertical illuminance of the ambient light at the opening.

3. The control device according to claim 1, wherein the ambient light adjusting unit is adapted to provide the ambient light adjusting signal depending on a comparison of the ambient light prediction values for the upcoming ambient light prediction time period with at least one ambient light prediction threshold value.

4. The control device according to claim 3, wherein the ambient light adjusting unit is adapted to provide the ambient light adjusting signal such that when the ambient light prediction values for the upcoming ambient light prediction time period are not all either larger than a first ambient light prediction threshold value or smaller than a second ambient light prediction threshold value, the second ambient light prediction threshold value being smaller than the first ambient light prediction threshold value, the ambient light adjusting signal indicates that no modification shall be made to the entering of ambient light into the space through the opening.

5. The control device according to claim 4, wherein a past ambient light sensing time period comprises one or more past days, wherein the ambient light prediction unit is adapted to provide the ambient light prediction value for a given time of day such that it is indicative of a probability that the ambient light property at the opening exceeds an ambient light property threshold value at the given time of day.

6. The control device according to claim 4, wherein a past ambient light sensing time period comprises one or more past days, wherein the ambient light prediction unit is adapted to provide the ambient light prediction value for a given time of day depending on a received sensed ambient light values for the given time of day at the one or more past days.

7. The control device according to claim 1, wherein the control device further comprises a sensed ambient light receiving unit for receiving sensed ambient light values indicative of the ambient light property at the opening , wherein the ambient light prediction unit is adapted to provide the ambient light prediction values depending on the received sensed ambient light values for a past ambient light sensing time period.

8. The control device according to claim 1, wherein the ambient light adjusting unit is adapted to provide the ambient light adjusting signal such that it indicates that the amount of ambient light entering the space through the opening shall be reduced, if a currently received sensed ambient light value exceeds a sensed ambient light threshold value.

9. The control device according to claim 1, wherein the control device comprises a predicted weather data receiving unit for receiving predicted weather data, wherein the ambient light adjusting unit is adapted to provide the ambient light adjusting signal depending on the received predicted weather data.

10. The control device according to claim 1, wherein the control device comprises a sensed occupancy state receiving unit for receiving a sensed occupancy state indicative of the space being occupied, wherein the ambient light adjusting unit is adapted to provide the ambient light for modifying the entering of ambient light into the space through the opening when the received sensed occupancy state indicates that the space is not occupied.

11. The control device according to claim 1, wherein the ambient light adjusting signal is adapted to indicate to the ambient light modifying element that an amount of ambient light entering a space through an opening shall be reduced, if:

$$P(v>\beta,t)>\delta_1 \text{ for } t_1 \le t \le t_2$$

where $\delta_1$ is a first ambient light prediction threshold value, and $t_1$, $t_2$ define the upcoming ambient light prediction time period.

12. The control device according to claim 11, wherein the ambient light adjusting signal is adapted to indicate to the ambient light modifying element that an amount of ambient light entering a space through an opening shall be increased, if:

$$P(v>\beta,t)<\delta_2 \text{ for } t_1 \le t \le t_2$$

where $\delta_2$ is a second ambient light prediction threshold value, wherein $\beta_2$ is smaller than the first ambient light prediction threshold value $\delta_1$.

13. A control method for use in an ambient light control method for controlling ambient light entering a space through an opening, the control method comprising:
    providing ambient light prediction values, by an ambient light prediction unit, wherein an ambient light prediction value is a prediction of an ambient light property at the opening, and
    providing, at different ambient light adjusting time points comprising at least a first ambient light adjusting time point and a second ambient light adjusting time point, an ambient light adjusting signal depending on the ambient light prediction values for an upcoming ambient light prediction time period, by an ambient light adjusting unit, wherein the ambient light adjusting signal is adapted for use by an ambient light modifying element for modifying the entering of ambient light into the space through the opening, wherein the upcoming ambient light prediction time period is the time period from the first ambient light adjusting time point until the second ambient light adjusting time point, wherein the first ambient light adjusting time point comprises a first ambient light prediction value, and wherein the first ambient light prediction value for the first ambient light adjusting time point comprises the following probability:

$$P(v>\beta, t)$$

where P is a probability that an ambient light property at the opening exceeds an ambient light property threshold value at a given time of day, t is the given time of day, v is the ambient light property at the opening, and β is the ambient light property threshold value.

14. The control method according to claim 13, wherein the ambient light adjusting signal is adapted to indicate to the ambient light modifying element that an amount of ambient light entering a space through an opening shall be reduced, if:

$$P(v>\beta,t)>\delta_1 \text{ for } t_1 \le t \le t_2$$

where $\delta_1$ is a first ambient light prediction threshold value, and $t_1$, $t_2$ define the upcoming ambient light prediction time period.

15. The control method according to claim 14, wherein the ambient light adjusting signal is adapted to indicate to the ambient light modifying element that an amount of ambient light entering a space through an opening shall be increased, if:

$$P(v > \beta, t) < \delta_2 \text{ for } t_1 \leq t \leq t_2$$

where $\delta_2$ is a second ambient light prediction threshold value, wherein $\delta_2$ is smaller than the first ambient light prediction threshold value $\delta_1$.

* * * * *